US 12,070,969 B2

(12) United States Patent
Sheng et al.

(10) Patent No.: US 12,070,969 B2
(45) Date of Patent: Aug. 27, 2024

(54) SPACE PEN REFILL FOR EXTRAVEHICULAR ACTIVITY

(71) Applicant: Ningbo Institute of Northwestern Polytechnical University, Zhejiang (CN)

(72) Inventors: Meiping Sheng, Shaanxi (CN); Tuo Zhao, Shaanxi (CN)

(73) Assignee: Ningbo Institute of Northwestern Polytechnical University, Zhejiang (CN)

( * ) Notice: Subject to any disclaimer, the term of this patent is extended or adjusted under 35 U.S.C. 154(b) by 0 days.

(21) Appl. No.: 18/465,389

(22) Filed: Sep. 12, 2023

(65) Prior Publication Data
US 2024/0140129 A1    May 2, 2024

(30) Foreign Application Priority Data
Oct. 27, 2022    (CN) .......................... 202211322607.2

(51) Int. Cl.
*B43K 7/04*    (2006.01)
*B43K 7/10*    (2006.01)
*B64G 4/00*    (2006.01)

(52) U.S. Cl.
CPC .................. *B43K 7/04* (2013.01); *B43K 7/10* (2013.01); *B64G 4/00* (2013.01)

(58) Field of Classification Search
CPC ... B43K 7/04; B43K 7/10; B43K 7/03; B43K 7/08; B43K 7/105; B43K 8/02; B43K 8/04; B64G 4/00

USPC .......................... 401/201, 217, 219, 232, 242
See application file for complete search history.

(56) References Cited

U.S. PATENT DOCUMENTS

| | | | |
|---|---|---|---|
| 4,472,462 A * | 9/1984 | Apice ...................... | D06Q 1/00 523/161 |
| 8,348,540 B2 * | 1/2013 | Bedhome ................ | B43K 8/06 401/199 |
| 10,603,947 B2 * | 3/2020 | Ballard .................... | B43K 8/04 |
| 2020/0207144 A1 | 7/2020 | Albenge et al. | |

FOREIGN PATENT DOCUMENTS

| | | |
|---|---|---|
| CN | 111319376 A | 6/2020 |
| JP | S60191484 | 12/1985 |
| JP | S62128882 | 8/1987 |
| JP | H0885290 | 4/1996 |
| JP | H08207483 | 8/1996 |

* cited by examiner

*Primary Examiner* — David J Walczak
(74) *Attorney, Agent, or Firm* — Pilloff Passino & Cosenza LLP; Rachel K. Pilloff; Sean A. Passino

(57) ABSTRACT

A space pen refill for an extravehicular activity, including a ball, a refill body, a fiber rod and a fiber ink-storage tube; the ball is rotatably connected in one end of the refill body, a segment of the ball is exposed outside the refill body, the fiber ink-storage tube is connected to an inside of the refill body, one end of the fiber rod is inserted into the fiber ink-storage tube, an other end of the fiber rod close to the ball is used to supply ink for the ball, an end face of an other end of the refill body is connected with first and second one-way valves, the first and second one-way valves are unidirectionally communicated with the inside and the outside of the refill body, and gas flow directions in the first and second one-way valves are opposite.

8 Claims, 2 Drawing Sheets

SPACE PEN REFILL FOR EXTRAVEHICULAR ACTIVITY

CROSS-REFERENCE TO RELATED APPLICATIONS

This application claims priority of Chinese Patent Application No. 202211322607.2, filed on Oct. 27, 2022, the entire contents of which are incorporated herein by reference.

TECHNICAL FIELD

The application relates to the technical field of stationery supplies, and in particular to a space pen refill for an extravehicular activity.

BACKGROUND

A space pen, a special pen designed for astronauts, is required to be used in a gravity-free state. Ordinary pens and ballpoint pens may not be used in the gravity-free state because they discharge the ink from the tip with the help of the gravity of droplets. Although pencils are not restricted by the gravity-free environment, lead refill may float in the gravity-free environment after broken, so the lead refill may drift into the nose and eyes or cause short circuit because of the conductivity, and lead refill and wood of the pencils are easy to burn quickly in the pure oxygen environment, so it is extremely dangerous to use pencils in the space capsule. To solve this problem, the United States has developed a space ballpoint pen for astronauts to use in space environment, but the price is very high. Now, China has also developed space pens with different principles, such as space gel pens, space ballpoint pens and multifunctional space pens. The space pen with excellent performance may be used not only in aerospace, but also in harsh environments such as mountaineering, diving, adventure tourism and polar exploration. For example, CN111319376A discloses a space refill, which uses a capillary material refill to discharge ink in a balanced way. However, space is not only a gravity-free environment, but also a pressure-free environment because there is no atmosphere. If the space refill in the above patent is used in the extravehicular activity, the internal pressure of the space refill is much greater than the external pressure, which causes the ink in the refill to be squeezed out and affects writing quality.

SUMMARY

An objective of the application is to provide a space pen refill for an extravehicular activity, which may prevent ink in the pen refill from being squeezed out due to pressure during the extravehicular activity, so as to solve the problems in the prior art.

To achieve the above objective, the present application adopts following technical schemes.

A space pen refill for extravehicular activity includes a ball, a refill body, a fiber rod and a fiber ink-storage tube, where the ball is rotatably connected in one end of the refill body, a segment of the ball is exposed outside the refill body, the fiber ink-storage tube is connected to an inside of the refill body, one end of the fiber rod is inserted into the fiber ink-storage tube, and an other end of the fiber rod close to the ball is used to supply ink for the ball; an end face of an other end of the refill body is connected with a first one-way valve and a second one-way valve, the first one-way valve and the second one-way valve are unidirectionally communicated with the inside of the refill body and an outside of the refill body, and a gas flow direction in the first one-way valve is opposite to a gas flow direction in the second one-way valve.

In this way, the embodiment has the following advantages. When the internal pressure and the external pressure of the refill body change, the first one-way valve and the second one-way valve control the balance of the internal pressure and the external pressure. When the space pen refill is used in the extravehicular activity, the internal pressure of the refill body is greater than the external pressure of the refill body and the internal gas flows out through the first one-way valve to maintain the balance of the internal pressure and the external pressure. When the space pen refill is used in the capsule, the external pressure of the refill body is greater than the internal pressure of the refill body and the external gas flows in through the second one-way valve to maintain the balance of the internal pressure and the external pressure. In this way, the ink in the refill body is prevented from being squeezed out, and the stability of ink discharge is improved; moreover, the first one-way valve and the second one-way valve also have a certain sealing function, so as to reduce the evaporation of the ink, further improve the writing quality, and prevent the ink from polluting the capsule environment and endangering human health and instrument safety.

Further, the refill body includes a ball seat, a connecting piece and a refill housing, where the ball seat is connected with the refill housing through the connecting piece, the ball seat is provided with a first through hole in an axial direction of the refill body, the connecting piece is provided with a second through hole in the axial direction of the refill body, the refill housing is provided with a mounting hole in the axial direction of the refill body, and the first through hole is communicated with the mounting hole through the second through hole, where an inner diameter of the second through hole is smaller than an inner diameter of the mounting hole; the fiber ink-storage tube is connected in the mounting hole, the ball is rotatably arranged in the first through hole, the segment of the ball is exposed outside the ball seat, the other end of the fiber rod passes through the second through hole and is in interference fit with the first through hole, and the first one-way valve and the second one-way valve are both connected to an end face of the refill housing away from the ball seat. In this way, the other end of the fiber rod is in interference fit with the first through hole, so as to improve the stability of the connection between the fiber rod and the refill body. At the same time, the fiber rod is connected with the fiber ink-storage tube, so the stability of the connection between the fiber ink-storage tube and the refill body is improved, the fiber rod and the fiber ink-storage tube are prevented from moving in the writing process, and further the writing quality is improved.

Further, an inner wall of the first through hole is provided with an annular protrusion, an end face of the other end of the fiber rod abuts against an end face of the annular protrusion close to the fiber rod, an inner peripheral wall of the annular protrusion is provided with a spherical position limiting groove, and the ball is rotatably connected with the spherical position limiting groove. In this way, by the annular protrusion, the ball is rotatably connected with the spherical position limiting groove and further the fiber rod is prevented from moving in the writing process.

Further, an end face of the connecting piece close to the refill housing is provided with a first protruding part, the second through hole penetrates through the first protruding part, and the first protruding part is inserted on an end face of the refill housing and is in interference fit with the refill housing. In this way, a detachable structure between the connecting piece and the refill housing is formed through the first protruding part, and when the ink in the fiber ink-storage tube is used up, ink may be injected into the fiber ink-storage tube by disassembling the connecting piece, so as to realize recycling.

Further, a second protruding part is arranged on an end face of the ball seat close to the connecting piece, the first through hole penetrates through the second protruding part, and the second protruding part is inserted into the second through hole and is in interference fit with an inner wall of the second through hole. In this way, the embodiment has the advantages of simple structure and convenient assembly.

Further, the inner diameter of the second through hole is greater than or equal to an inner diameter of the first through hole. In this way, if the inner diameter of the second through hole is greater than the inner diameter of the first through hole, a gap is arranged between the inner wall of the second through hole and the fiber rod, which is convenient for assembly; if the inner diameter of the second through hole is equal to the inner diameter of the first through hole, the second through hole is in interference fit with the fiber rod and the fiber rod is further fixed.

Further, the one end of the fiber rod is tapered, which is convenient to be inserted into the fiber ink-storage tube.

Further, a gap is arranged between the other end of the fiber rod and the ball, where a size range of the gap is 0.01 millimeter to 0.08 millimeter. In this way, the gap between the other end of the fiber rod and the ball may avoid the abrasion of the fiber rod caused by the rotation of the ball in the writing process, and the fiber rod supplies ink for the ball through the capillary principle. If the gap is too small, there is still the possibility of contact between the fiber rod and the ball; and if the gap is too large, the ink supply of the fiber rod for the ball is affected.

DETAILED DESCRIPTION OF THE EMBODIMENTS

In the following, a space pen refill for an extravehicular activity of the application is described in detail with the drawings.

Figure 1:
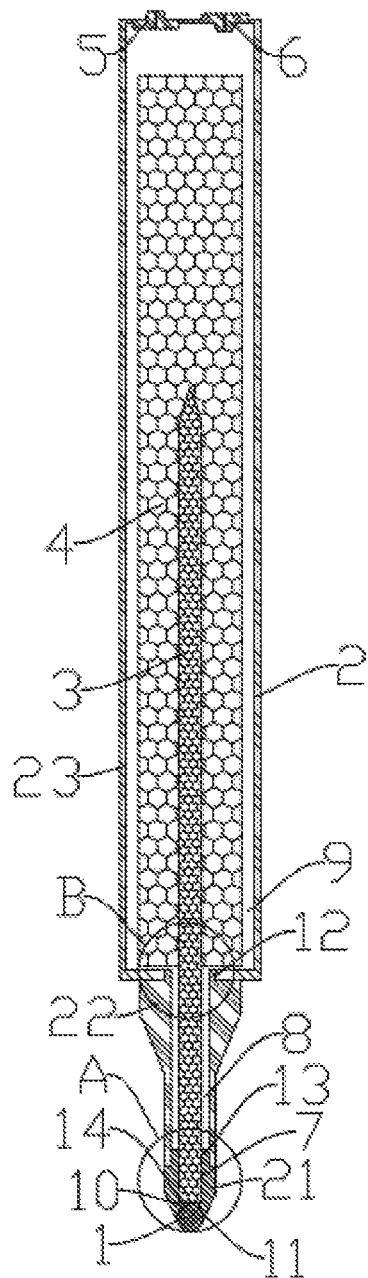
FIG. 1 is a schematic structural diagram of a space pen refill for extravehicular activity of the present application.
Figure 2:
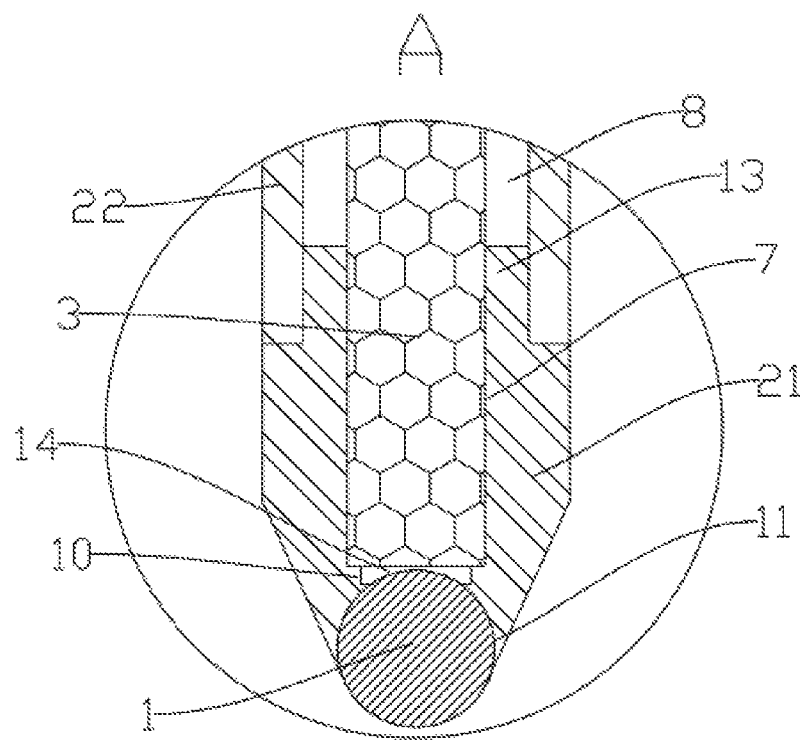
FIG. 2 is a partial enlarged view of A in FIG. 1.
Figure 3:
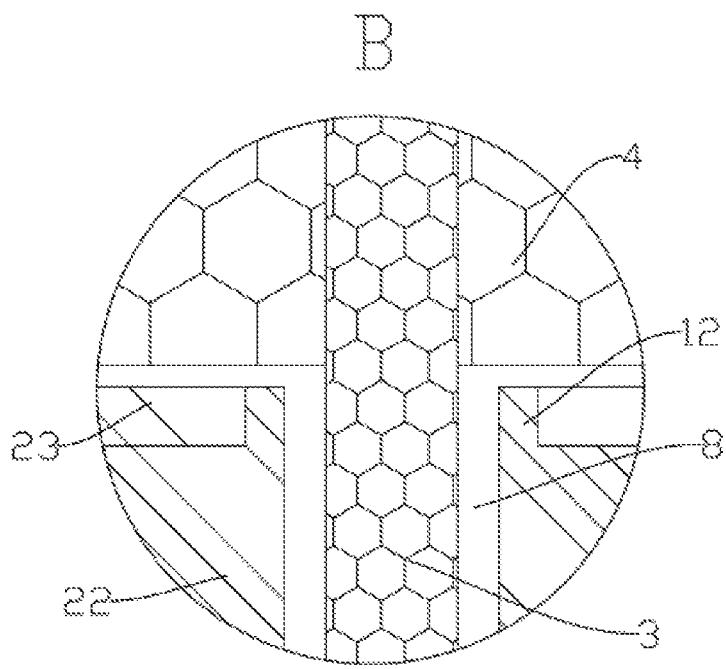
FIG. 3 is a partial enlarged view of B in FIG. 1.

As shown in FIG. 1 to FIG. 3, a space pen refill for extravehicular activity includes a ball 1, a refill body 2, a fiber rod 3 and a fiber ink-storage tube 4, where the ball 1 is rotatably connected in one end of the refill body 2, a segment of the ball 1 is exposed outside the refill body 2, the fiber ink-storage tube 4 is connected to an inside of the refill body 2, one end of the fiber rod 3 is inserted into the fiber ink-storage tube 4, and an other end of the fiber rod 3 close to the ball 1 is used to supply ink for the ball 1; an end face of an other end of the refill body 2 is connected with a first one-way valve 5 and a second one-way valve 6, the first one-way valve 5 and the second one-way valve 6 are both unidirectionally communicated with the inside of the refill body 2 and an outside of the refill body 2, and a gas flow direction in the first one-way valve 5 is opposite to a gas flow direction in the second one-way valve 6. As shown in FIG. 1, the ball 1 is rotatably connected in the lower end of the refill body 2, the upper end of the fiber rod 3 is inserted into the fiber ink-storage tube 4, and the lower end of the fiber rod 3 is arranged close to the ball 1. As shown in FIG. 2, a gap 14 is arranged between the other end of the fiber rod 3 and the ball 1, that is, the gap 14 is arranged between the lower end of the fiber rod 3 and the ball 1, and a size range of the gap 14 is 0.01 mm to 0.08 mm; in this way, it may not only avoid the abrasion of the fiber rod 3 caused by the contact between the ball 1 and the fiber rod 3, but also supply ink for the ball 1 by the fiber rod 3 based on the capillary principle. Moreover, the first one-way valve 5 and the second one-way valve 6 are both arranged on an end face of an upper end of the refill body 2, and both are communicated with the inner space of the refill body 2, where the gas circulation direction in the first one-way valve 5 is from the inside to the outside of the refill body 2, and the gas circulation direction in the second one-way valve 6 is from the outside to the inside of the refill body 2; in the embodiment, both the first one-way valve 5 and the second one-way valve 6 are silica gel breathing valves, the valves may only be opened in one direction, and when single-side airflow passes, the valves are opened to allow the airflow to pass.

As shown in FIG. 1, the refill body 2 includes a ball seat 21, a connecting piece 22 and a refill housing 23, the ball seat 21 is connected with the refill housing 23 through the connecting piece 22, that is, an upper end of the ball seat 21 is connected to a lower end of the connecting piece 22, and a upper end of the connecting piece 22 is connected to a lower end of the refill housing 23; the first one-way valve 5 and the second one-way valve 6 are both connected with an end face of the refill housing 23 away from the ball seat 21, that is, the first one-way valve 5 and the second one-way valve 6 are both connected with an upper end of the refill housing 23, and the ball 1 is connected with a lower end of the ball seat 21; the ball seat 21 is provided with a first through hole 7 in an axial direction of the refill body 2, the connecting piece 22 is provided with a second through hole 8 in the axial direction of the refill body 2, the refill housing 23 is provided with a mounting hole 9 in the axial direction of the refill body 2, the first through hole 7, the second through hole 8 and the mounting hole 9 are all coaxially arranged, the first through hole 7 is communicated with the mounting hole 9 through the second through hole 8, where an inner diameter of the second through hole 8 is smaller than an inner diameter of the mounting hole 9, and the second through hole 8 penetrates to a lower end face of the refill housing 23 to communicate with the mounting hole 9; the fiber ink-storage tube 4 is connected in the mounting hole 9, the ball 1 is rotatably arranged in the first through hole 7, the segment of the ball 1 is exposed outside the ball seat 21 for writing, and the other end of the fiber rod 3 passes through the second through hole 8 and is in interference fit with the first through hole 7. The inner diameter of the second through hole 8 is greater than or equal to the inner diameter of the first through hole 7; if the inner diameter of the second through hole 8 is greater than the inner diameter of the first through hole 7, a gap is arranged between the inner wall of the second through hole 8 and the fiber rod 3, which is convenient for assembly; if the inner diameter of the second through hole 8 is equal to the inner diameter of the first through hole 7, the second through hole 8 is in interference fit with the fiber rod 3 and the fiber rod 3 is further fixed. As shown in FIG. 1 and FIG. 2, in the embodiment, the inner diameter of the second through hole 8 is larger than the inner diameter of the first through hole 7, and a gap is arranged between the inner wall of the second through hole 8 and the fiber rod 3.

As shown in FIG. 2, an inner wall of the first through hole 7 is provided with an annular protrusion 10, an end face of the other end of the fiber rod 3 abuts against an end face of the annular protrusion 10 close to the fiber rod 3, an inner peripheral wall of the annular protrusion 10 is provided with a spherical position limiting groove 11, and the ball 1 is rotatably connected with the spherical position limiting groove 11. In the embodiment, the inner wall of the first through hole 7 close to the lower end of the ball seat 21 is provided with an annular protrusion 10, and the end face of the lower end of the fiber rod 3 abuts against an upper end face of the annular protrusion 10, so that the fiber rod 3 may not move in the direction of the ball 1, and the abrasion of the fiber rod 3 caused by the contact between the ball 1 and the fiber rod 3 is prevented. The spherical position limiting groove 11 is arranged on the inner peripheral wall of a lower end of the annular protrusion 10 and extends to the ball seat 21, the ball 1 is embedded in the spherical position limiting groove 11, and the ball seat 21 is integrally formed with the annular protrusion 10; as shown in FIG. 1, one end of the fiber rod 3 is tapered, that is, the upper end of the fiber rod 3 is tapered.

As shown in FIG. 3, an end face of the connecting piece 22 close to the refill housing 23 is provided with a first protruding part 12, the second through hole 8 penetrates through the first protruding part 12, and the first protruding part 12 is inserted on an end face of the refill housing 23 and is in interference fit with the refill housing 23, that is, the upper end face the connecting piece 22 is provided with the first protruding part 12 coaxially arranged with the connecting piece 22, and the connecting piece 22 is integrally formed with the first protruding part 12, and an outer peripheral wall of the first protruding part 12 forms an interference fit with an inner peripheral wall of the lower end face of the refill housing 23. As shown in FIG. 2, a second protruding part 13 is arranged on an end face of the ball seat 21 close to the connecting piece 22, the first through hole 7 penetrates through the second protruding part 13, and the second protruding part 13 is inserted into the second through hole 8 and is in interference fit with an inner wall of the second through hole 8, that is, the upper end face of the ball seat 21 is provided with a second protruding part 13 coaxial with the ball seat 21, and the ball seat 21 is integrally formed with the second protruding part 13, so that an interference fit is formed between the outer peripheral wall of the second protruding part 13 and the inner wall of the second through hole 8.

When the internal pressure and the external pressure of the refill body 2 change, the first one-way valve 5 and the second one-way valve 6 control the balance of the internal pressure and the external pressure. When the space pen refill is used in the extravehicular activity, the internal pressure of the refill body 2 is greater than the external pressure of the refill body 2 and the internal gas flows out through the first one-way valve 5 to maintain the balance of the internal pressure and the external pressure. When the space pen refill is used in the capsule, the external pressure of the refill body 2 is greater than the internal pressure of the refill body 2 and the external gas flows in through the second one-way valve 6 to maintain the balance of the internal pressure and the external pressure. In this way, the ink in the refill body 2 is prevented from being squeezed out, and the stability of ink discharge is improved; moreover, the first one-way valve 5 and the second one-way valve 6 also have a certain sealing function, so as to reduce the evaporation of the ink, further improve the writing quality, and prevent the ink from polluting the capsule environment and endangering human health and instrument safety.

The embodiment of this application has been described in detail with the drawings above, but this application is not limited to the above one embodiment, and all other embodiments obtained by the technicians in this field without creative work are within the scope of protection of this application.

What is claimed is:

1. A space pen refill for an extravehicular activity, comprising a ball, a refill body, a fiber rod and a fiber ink-storage tube, wherein the ball is rotatably connected in one end of the refill body, a segment of the ball is exposed outside the refill body, the fiber ink-storage tube is connected to an inside of the refill body, one end of the fiber rod is inserted into the fiber ink-storage tube, and an other end of the fiber rod close to the ball is used to supply ink for the ball; an end face of an other end of the refill body is connected with a first one-way valve and a second one-way valve, the first one-way valve and the second one-way valve are unidirectionally communicated with the inside of the refill body and an outside of the refill body, and a gas flow direction in the first one-way valve is opposite to a gas flow direction in the second one-way valve.

2. The space pen refill for the extravehicular activity according to claim 1, wherein the refill body comprises a ball seat, a connecting piece and a refill housing, the ball seat is connected with the refill housing through the connecting piece, the ball seat is provided with a first through hole in an axial direction of the refill body, the connecting piece is provided with a second through hole in the axial direction of the refill body, the refill housing is provided with a mounting hole in the axial direction of the refill body, the first through hole is communicated with the mounting hole through the second through hole, and an inner diameter of the second through hole is smaller than an inner diameter of the mounting hole; the fiber ink-storage tube is connected in the mounting hole, the ball is rotatably arranged in the first through hole, the segment of the ball is exposed outside the ball seat, the other end of the fiber rod passes through the second through hole and is in interference fit with the first through hole, and the first one-way valve and the second one-way valve are both connected to an end face of the refill housing away from the ball seat.

3. The space pen refill for the extravehicular activity according to claim 2, wherein an inner wall of the first through hole is provided with an annular protrusion, an end face of the other end of the fiber rod abuts against an end face of the annular protrusion close to the fiber rod, an inner peripheral wall of the annular protrusion is provided with a spherical position limiting groove, and the ball is rotatably connected with the spherical position limiting groove.

4. The space pen refill for the extravehicular activity according to claim 2, wherein an end face of the connecting piece close to the refill housing is provided with a first protruding part, the second through hole penetrates through the first protruding part, and the first protruding part is inserted on an end face of the refill housing and is in interference fit with the refill housing.

5. The space pen refill for the extravehicular activity according to claim 2, wherein a protruding part is arranged on an end face of the ball seat close to the connecting piece, the first through hole penetrates through the protruding part, and the protruding part is inserted into the second through hole and is in interference fit with an inner wall of the second through hole.

6. The space pen refill for the extravehicular activity according to claim 2, wherein the inner diameter of the second through hole is greater than or equal to an inner diameter of the first through hole.

7. The space pen refill for the extravehicular activity according to claim 1, wherein the one end of the fiber rod is tapered.

8. The space pen refill for the extravehicular activity according to claim 1, wherein a gap is arranged between the other end of the fiber rod and the ball, and a size range of the gap is 0.01 millimeter to 0.08 millimeter.

\* \* \* \* \*